Jan. 2, 1923.
B. H. BLOOD.
GAUGE.
FILED FEB. 2, 1921.
1,440,441
2 SHEETS-SHEET 1
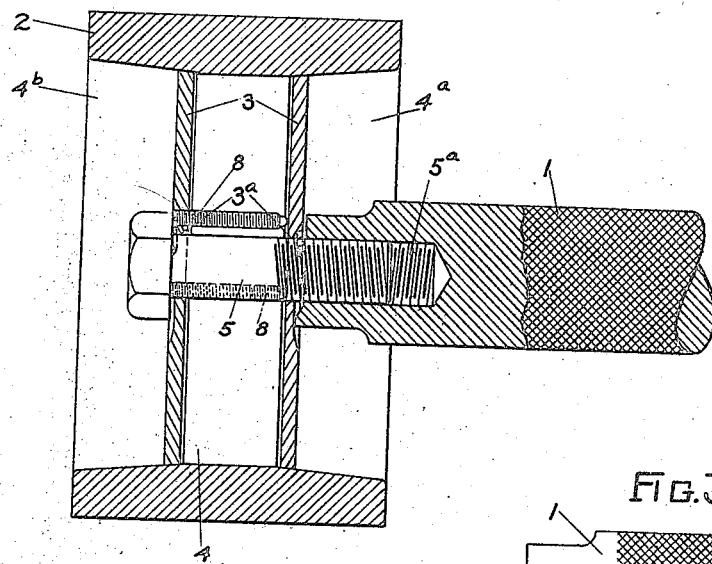
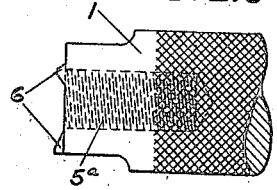
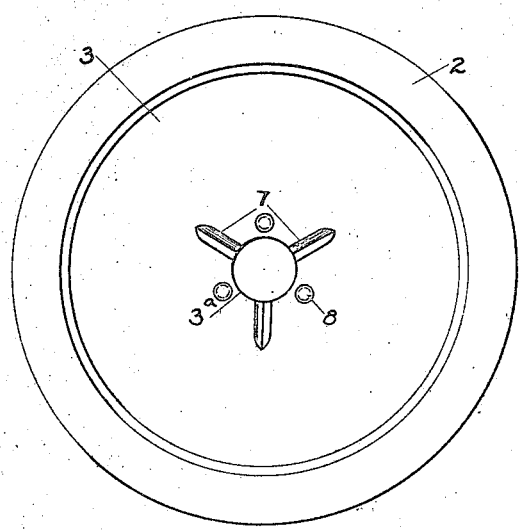
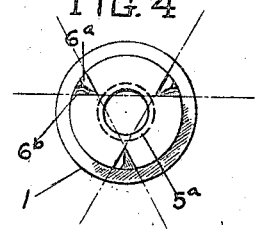
Inventor
B. H. Blood
By Joseph K. Schofield
Attorney Jan. 2, 1923.

B. H. BLOOD.
GAUGE.
FILED FEB. 2, 1921.

Inventor
B. H. Blood
By Joseph K. Schofield
Attorney

Patented Jan. 2, 1923.

1,440,441

UNITED STATES PATENT OFFICE.

BRYANT H. BLOOD, OF HARTFORD, CONNECTICUT, ASSIGNOR TO PRATT & WHITNEY COMPANY, OF NEW YORK, N. Y., A CORPORATION OF NEW JERSEY.

GAUGE.

Application filed February 2, 1921. Serial No. 441,860.

*To all whom it may concern:*

Be it known that I, BRYANT H. BLOOD, a citizen of the United States, residing at Hartford, in the county of Hartford and State of Connecticut, have invented certain new and useful Improvements in Gauges, of which the following is a specification.

This invention relates to gauges and particularly to plug gauges preferably of the "go" and "not go" type adapted to measure circular openings to determine accurately when such openings are of a predetermined dimension. It is the primary object of the invention to provide an improved gauge of this general type.

It is an object of the invention to provide simple and improved means for securing the gaging heads to the gauge handle and other improved means for preventing relative rotation of the gaging heads and handle.

A further object of the invention is to provide a gauge of the type defined comprising few and simple parts, including a pair of disks or plates mounted in the gaging head, such parts being adapted to be easily manufactured and assembled with a minimum of time and expense and providing, when assembled, a gauge of a very rigid and substantial character.

A further object of the invention is to provide improved supporting means comprising a pair of disks or plates in the gaging head, means for preventing relative movement or distortion of the plates within the head, and means engaging the plates and gauge handle for mounting the head on the handle in either of two reversible positions.

With the above and other objects in view, as will appear as the description proceeds, the invention will now be described with reference to the drawings wherein:

Figure 1 is a longitudinal sectional view through one end of the gauge showing the gaging head mounted on the handle.

Fig. 2 is a face or end view of the gaging head.

Fig. 3 is a side elevation of one end of the gauge handle.

Fig. 4 is an outer end view thereof.

The present invention involves particularly the production of a plug gauge preferably of the reversible type having a gaging head provided therein with a pair of disks or plates and means extending from one or both disks to the gauge handle for securing the head to the handle. The disks may be permanently or otherwise secured within the head and the handle may be secured thereto in any convenient and desirable manner.

Figure 7:
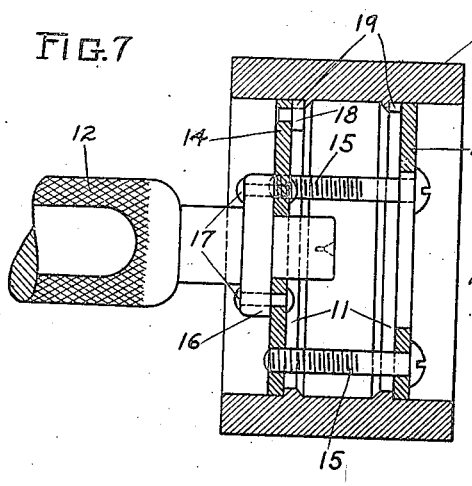
Fig. 7 is a longitudinal sectional view showing a modified form of the invention.
Figure 10:
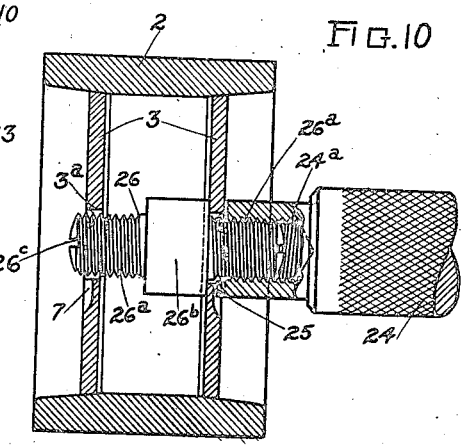
Fig. 10 is a longitudinal sectional view showing a further modified form of the invention.
Figure 5:
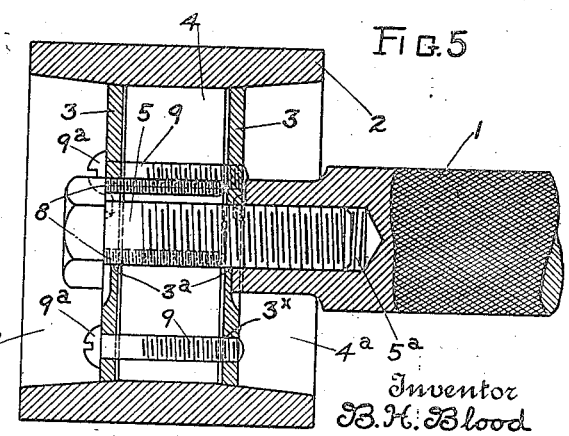
Fig. 5 is a longitudinal sectional view of a gauge slightly modified from that shown in Fig. 1.

As illustrated in Figs. 1, 5 and 10, the disks are permanently secured within the head, while Fig. 7 illustrates the disks as detachably secured within the head. Means are preferably provided in certain of these constructions for preventing relative movement and distortion of the disks. Means are also provided for preventing the rotation of the handle relative to the head and in Figs. 1, 5 and 10, this means comprises a recess or recesses in the disks for receiving a projection or projections on the handle. The several parts comprising the invention are very simple whereby the same may be inexpensively and easily manufactured and when assembled will provide a very suitable and substantial gauge of the type defined.

Referring particularly to Figs. 1 to 4 of the drawings, Fig. 1 illustrates one end of a "go" and "not go" plug gauge or, if desired, the gauge may be provided with a gaging head on one end only thereof. In the drawings, 1 designates the gauge handle and 2 the gaging head. The head is adapted to be secured to the handle by means of a pair of disks or plates 3 illustrated as separate elements wedged within a central opening 4 in the head. This opening comprises two outer openings or portions 4ª and 4ᵇ in each end of the head, such portions being preferably tapered inwardly whereby the disks may be securely wedged therein.

One step in the manufacture of gauges of the type herein defined comprises the hardening of the gauge head 2. During this operation the head usually goes slightly out of round. The disks 3 are finished round and are not hardened. When the disks are forced into the gauge head, they tend to correct the distortion of hardening, so round up the gauge head, and also serving to expand the gauge head so that variations in shrinkage during hardening may be compensated for. In practice, a very small amount of metal is left on the outside of the gauge head for grinding and lapping, and the disks are forced in under an arbor press to expand the ring and give just stock enough for finishing. In the finished gauge head, the disks are permanently secured frictionally within the ring 2.

It is quite desirable that the disks be held from relative movement or distortion since such movement would appreciably effect the accuracy of measurement of the head 2. To prevent such distortion, I provide the disks with means, as a plurality of screw threaded members 8, threadedly engaging one of the disks and bearing against the other disk. In practice each of these members is threaded into one of the disks until the other end thereof engages the other disk with the desired pressure, whereupon the member is cut off flush with the disk.

I have illustrated the gaging heads as secured to the handle by means of a bolt 5 passing through holes $3^a$ in the disks and screw threaded into a bore $5^a$ in the handle, one disk being engaged by the bolt head and the other being engaged by the end of the handle. The screws 8 prevent the distortion of the disks by the bolt 5. Means for preventing the rotation of the head relative to the handle comprises inter-engaging projections and recesses between the head and handle. As illustrated, the handle is provided with a plurality of angular projections 6 having sloping sides $6^a$ and $6^b$ adapted to engage corresponding recesses 7 in the adjacent disk 3. By arranging the projections as illustrated, the same may be formed on the handle by three milling cuts across the handle taken on the dot and dash lines shown in Fig. 4. Preferably the recesses 7 are formed in both disks which may be identical, whereby the gaging head is adapted to be reversibly mounted on the handle. Thus when the forward end of the gauge head becomes worn the head may be reversibly mounted on the handle whereby the opposite and unworn end of the head becomes the forward end of the gauge.

Figure 6:
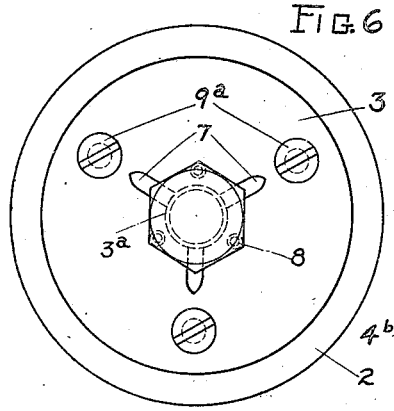
Fig. 6 is an end view thereof.

The gage illustrated in Figs. 5 and 6 is like that just described except that further means has been provided for holding the plates or disks against relative movement and distortion. This means also comprises a plurality of members, as the bolts 9, threadedly engaging one disk and bearing against the other disk, the heads $9^a$ of the bolts bearing against the outer disk 3 and the bolts threaded by engaging in the other disk at $3^x$. By this construction, the parts are not only prevented from distortion inwardly by the members 8, but are also prevented from distortion outwardly by means of the bolts 9.

Figure 8:
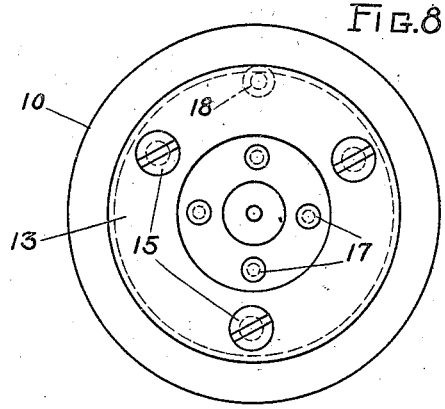
Fig. 8 is an end view thereof.

Figs. 7 and 8 illustrate a modified form of the invention wherein the supporting plates or disks are detachably mounted within the gaging head. In this form of the invention, 10 designates the gaging head within which are formed two annular shoulders 11. The head is adapted to be secured to the gauge handle 12 by means of a pair of plates 13 and 14 and a plurality of screws 15 for connecting the plates together. The handle is provided with an annular shoulder 16 to which is secured the plate 14 by means of rivets 17. A lug 18 secured to the plate 14 is adapted to engage in a notch 19 in one of the shoulders 11 to prevent rotation of the head on the handle. It will be seen that the plates 13 and 14 are adapted to be drawn into tight engagement with the shoulders 11 by means of the screws 15 and since the handle is rigidly secured to one of the plates, the gaging head is adapted thereby to be rigidly mounted on the handle.

Figure 9:
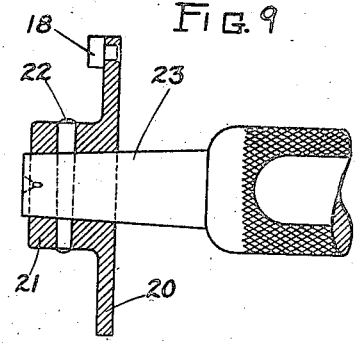
Fig. 9 is a side elevation of the gauge handle showing a modified manner of mounting one of the supporting disks thereon.

In Fig. 9 is illustrated another manner of securing one of the supporting plates to the handle. The plate 20 herein is provided with a hub 21 and a pin 22 extending through the hub and handle secures the plate to the handle. The portion 23 of the handle is preferably tapered as illustrated.

In Fig. 10, I have illustrated a modified form of the invention wherein the gaging head is secured to the handle through only one of the two disks. The gaging head 2 and the disks or plates 3 therein are the same as those heretofore described in reference to Figs. 1 and 5. No means for preventing relative distortion of the disks is illustrated however since in securing the head to the handle only one of the disks is engaged and there is no tendency to distort the disks by the holding means, as by the bolt 5 shown in Figs. 1 and 5. The handle 24 is substantially the same as the handle 1, being provided with a threaded bore $24^a$ and three projections 25 at the end thereof for engaging corresponding recesses 7 in either disk 3. A bolt 26 having screw threaded portions $26^a$ at the opposite ends thereof and a head portion $26^b$ at the center is adapted to cooperate with the handle to secure the head thereto. The threaded portions $26^a$ of the bolt extend loosely into the openings $3^a$ of the disks and by means of a screw driver engaging in the slots $26^c$, the bolt is adapted to be screwed into the handle end to grip one of the disks tightly between the bolt head 26ᵇ and the handle end. It should be understood that the gaging head 2 is of hardened steel whereas the disks 3 are relatively soft and in the process of assembling the disks are tightly wedged into a frictional contact with the hardened head in a manner to prevent any looseness thereof.

While the accompanying drawings show certain embodiments of my invention, it should be understood that the invention is not limited to the structures shown specifically therein. For instance, the disks 3, 13 and 14 are illustrated as flat, round plates and while plates having such configuration may be preferable, it is obvious that plates of other shapes clearly come within the scope of the invention. Other modifications within the scope of the appended claims are considered as being within the scope of the invention.

What I claim is:

1. In a gauge, the combination of a gaging head having an opening in each end face thereof, a gauge handle supporting means secured to the head in each of such openings, independently of the handle and means securing the handle to the supporting means whereby the head is securely mounted on the handle.

2. In a gauge, the combination of a gaging head, a gauge handle, a pair of supporting disks secured to the head respectively on opposite sides of the center thereof, and means for securing the handle to at least one of the supporting disks whereby the head is securely mounted on the handle.

3. In a gauge, the combination of a gaging head, a gauge handle, a pair of supporting disks secured to the head respectively on opposite sides of the center thereof, and means detachably securing the handle to the head with either disk in engagement with the handle whereby the head is securely mounted on the handle.

4. In a gauge, the combination of a one-piece gaging head having an opening in each end face thereof, a gage handle, supporting means mounted in each of said openings, means securing the handle to the supporting means whereby the head is securely mounted on the handle, and means for preventing the rotation of the head relative to the handle.

5. In a gauge, the combination of a gaging head having an opening in each end face thereof, a supporting plate mounted in each of such openings, means for holding the plates against relative movement and distortion within the said openings, a gauge handle, and means for securing the plates to the handle whereby the head is securely mounted on the handle.

6. In a gauge, the combination of a gaging head having an opening in each end face thereof, a supporting disk mounted in each opening, means for securing the disks within the said openings, a gauge handle, and means for securing the supporting disks to the handle whereby the head is securely mounted on the handle.

7. In a gauge, the combination of a gaging head having an opening in each end face thereof, a supporting disk mounted in each opening, means comprising a plurality of bolts engaging the disks for securing the same within the said openings, a gauge handle, and means securing the supporting disks to the handle whereby the head is securely mounted on the handle.

8. In a gauge, the combination of a gaging head having an opening in each end face thereof, a supporting plate mounted in each of such openings, means threadedly engaging one plate and bearing against the other plate for holding the plates against relative movement and distortion within the said openings, a gauge handle, and means for securing the plates to the handle whereby the head is securely mounted on the handle.

9. In a gauge, the combination of a gaging head having an opening in each end face thereof, a supporting plate permanently mounted in each of such openings, a gauge handle, and means for holding one of the plates in contact with the handle whereby the head is securely mounted on the handle.

10. In a gauge, the combination of a gaging head having an inwardly tapered opening in each end face thereof, a supporting plate permanently mounted in each of such openings, means for holding the plates against relative movement and distortion within the said openings, a gauge handle, and means for securing the plates to the handle whereby the head is securely mounted on the handle.

11. In a gauge, the combination of a gaging head having an opening in each end face thereof, a supporting plate mounted in each of such openings, a gauge handle, means securing one of the plates to the handle whereby the head is securely mounted on the handle, and means comprising a projection engaging a recess between the gauge handle and one of the plates for preventing the rotation of the head relative to the handle.

12. In a gauge, the combination of a gaging head having an opening in each end face thereof, a supporting plate mounted in each of such openings, a gauge handle, means extending through the plates and secured to the handle whereby the head is securely mounted on the handle, and means for preventing the rotation of the head relative to the handle.

13. In a gauge, the combination of a gaging head having an opening in each end face thereof, a supporting plate mounted in each of such openings, a gauge handle, a bolt extending through the plates and screw-threaded into the handle whereby the head is securely mounted on the handle, and means comprising three inter-engaging projections and recesses between the handle and one of the plates for preventing the rotation of the head relative to the handle.

14. In a gauge, the combination of a gaging head having an opening in each end face thereof, a supporting plate mounted in each of such openings, a gauge handle, means securing the plates to the handle with either plate in engagement with the handle whereby the head is securely mounted on the handle, each plate being provided with a recess adjacent the center thereof, and a projection on the other end of the handle for engaging the recess in either plate for preventing the rotation of the head relative to the handle.

In testimony whereof, I hereto affix my signature.

BRYANT H. BLOOD.